(12) United States Patent
Torikoshi

(10) Patent No.: US 7,760,395 B2
(45) Date of Patent: Jul. 20, 2010

(54) BACKGROUND COLOR CONVERSION FOR TONER-SAVING PRINTING

(75) Inventor: Keiko Torikoshi, San Mateo, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 684 days.

(21) Appl. No.: 11/529,896

(22) Filed: Sep. 28, 2006

(65) Prior Publication Data

US 2008/0079962 A1 Apr. 3, 2008

(51) Int. Cl.
H04N 1/60 (2006.01)
G06K 15/00 (2006.01)

(52) U.S. Cl. ...................... 358/1.9; 358/1.18

(58) Field of Classification Search .............. 358/1.9, 358/2.1, 3.27, 1.18, 500, 518, 530, 531, 537, 358/538, 1.1, 3.22, 3.13, 501, 3.23, 452, 358/453, 464, 465, 466, 1.2; 382/162, 164, 382/167, 163, 165; 347/115, 172, 184; 399/39, 399/54, 112

See application file for complete search history.

(56) References Cited

U.S. PATENT DOCUMENTS

| 6,297,796 | B1 | 10/2001 | Letts et al. |
| 6,579,324 | B1* | 6/2003 | Lowry et al. ............. 715/243 |
| 6,628,425 | B1 | 9/2003 | Martinez |
| 6,996,272 | B2* | 2/2006 | Chen et al. ................ 382/173 |
| 2002/0030838 | A1* | 3/2002 | Toyama et al. ............ 358/1.13 |
| 2002/0037103 | A1* | 3/2002 | Hong et al. ............... 382/173 |
| 2002/0159080 | A1* | 10/2002 | Feng et al. ................ 358/1.9 |
| 2006/0187477 | A1 | 8/2006 | Maki et al. |
| 2006/0215910 | A1* | 9/2006 | Megawa .................... 382/176 |

OTHER PUBLICATIONS

D. Raggett et al. (editors) HTLM 4.0 Specification. http://www.w3.org/TR/1998/REC-html40-19980424 Created Apr. 24, 1998, accessed Dec. 8, 2008.*

* cited by examiner

Primary Examiner—Dov Popovici
(74) Attorney, Agent, or Firm—Chen Yoshimura LLP

(57) ABSTRACT

A toner saving printing method and related computer program product is described. The program analyzes an input file to extract data that represents background, and if the background is a solid dark color, changes the background to a colorless or a lighter color background. The colors of the foreground objects such as text and graphics are changed correspondingly to maintain adequate contrast between the foreground objects and the background. The method can be implemented as a part of a printer driver.

24 Claims, 4 Drawing Sheets

US 7,760,395 B2

BACKGROUND COLOR CONVERSION FOR TONER-SAVING PRINTING

BACKGROUND OF THE INVENTION

1. Field of the Invention

This invention relates to a printing method, and in particular, it relates to a toner-saving printing method that removes dark colored background before printing.

2. Description of the Related Art

Many documents, especially documents that are intended to be viewed using a display screen or projector, such as web pages and PowerPoint® documents, have a dark solid color or patterned background for visual appeal. When such documents are printed, it is often desirable to print the background with a lighter color or no color (white) to save toner or ink. Some application software, such as PowerPoint®, provides printing modes that allow a page having a dark background to be printed with a light background or no background in certain instances. Internet Explorer also has the ability to display a web page with a dark background and print the page with a white background. In another example, U.S. Pat. No. 6,297,796 to Letts et al. describes a method and apparatus, used in an oscilloscope or other test and measurement instrument, "for inverting a color display on a dark background to produce a display on a substantially white background suitable for printing, [which] maintain[s] the same apparent relative intensities in both the LCD display on a dark background and the hardcopy displayed on a light background. The apparatus includes a memory including a first palette for the LCD display, a second palette for the hardcopy display, and a look-up table. A controller accesses the first and second palettes and look-up table for converting display data from LCD data to color-inverted printer data." (Abstract.)

SUMMARY OF THE INVENTION

There exist a need for a program of more general applicability that processes an input file to remove dark background for printing.

Accordingly, the present invention is directed to a printing method and apparatus that fulfills this need.

An object of the present invention is to provide a printing method that saves toner or ink.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for printing an input file, which includes: (a) analyzing the input file to extract data representing a background; (b) determining a color of the background; and (c) if the color of the background is darker than a first threshold color value, changing the color of the background. In one example, the color of the background is changed to a white color. In another example, a saturation of the background color is changed.

In another aspect, the present invention provides a computer program product that implements the above method.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention process an input document submitted for printing, which may be in a variety of formats such as PostScript, Portable Document Format (PDF), HyperText Markup Language (HTML)/Extensible HyperText Markup Language (XHTML), XPS, PCL, JPEG, TIFF, etc., to remove dark background colors in the document or change their saturation before printing the document. By removing or changing the background color, printing of large areas of solid color is avoided, thereby reducing toner or ink consumption and reducing printing cost.

Figure 1:
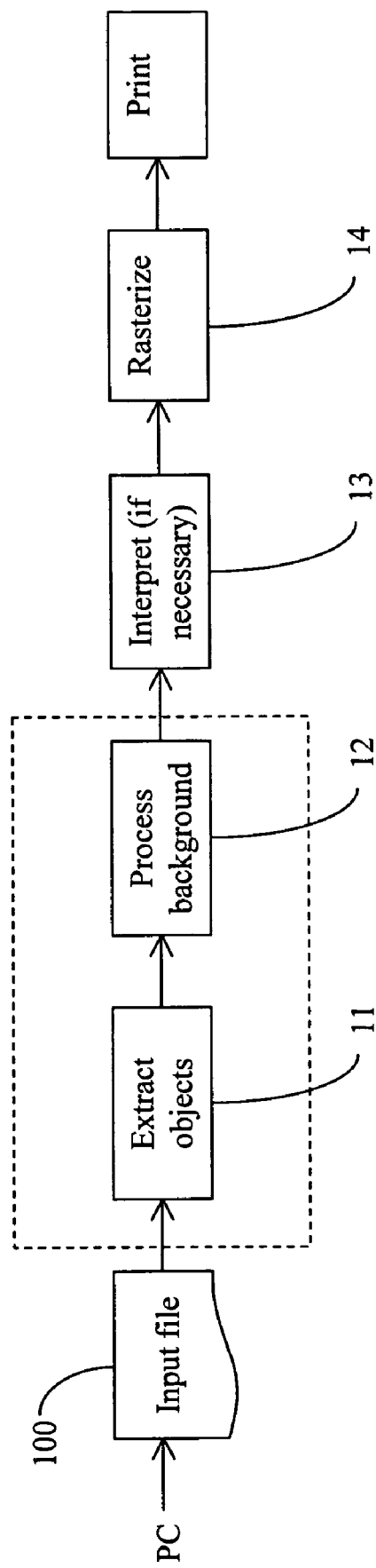
FIG. 1 illustrates a process of background conversion according to an embodiment of the present invention.

FIG. 1 illustrates a background removal process for an input document 100 originated from a computer (PC). The input document may be in a format commonly used for printers, such as PostScript, Portable Document Format (PDF), HyperText Markup Language (HTML)/Extensible HyperText Markup Language (XHTML), XPS, PCL, JPEG, TIFF, etc. First, the objects such as text, graphics (vector graphics and raster graphics), photographs and other objects contained in the document are extracted (process 11). Then, the background contained in the document is processed (process 12). The resulting processed document is interpreted if necessary (e.g. for PostScript files) (process 13), and rasterized (process 14) for printing. Interpretation (13) and rasterization (14) are conventional steps, while object extraction (11) and background processing (12) implement embodiment of the present invention.

The object extraction and background processing processes 11 and 12 may be implemented as a part of the printer driver software, or a part of an application program that generates the pages to be printed. It may also be implemented in the printer itself as firmware or hardware. The program code that carries out the method may be stored in a ROM of a computer or printer.

Figure 2:
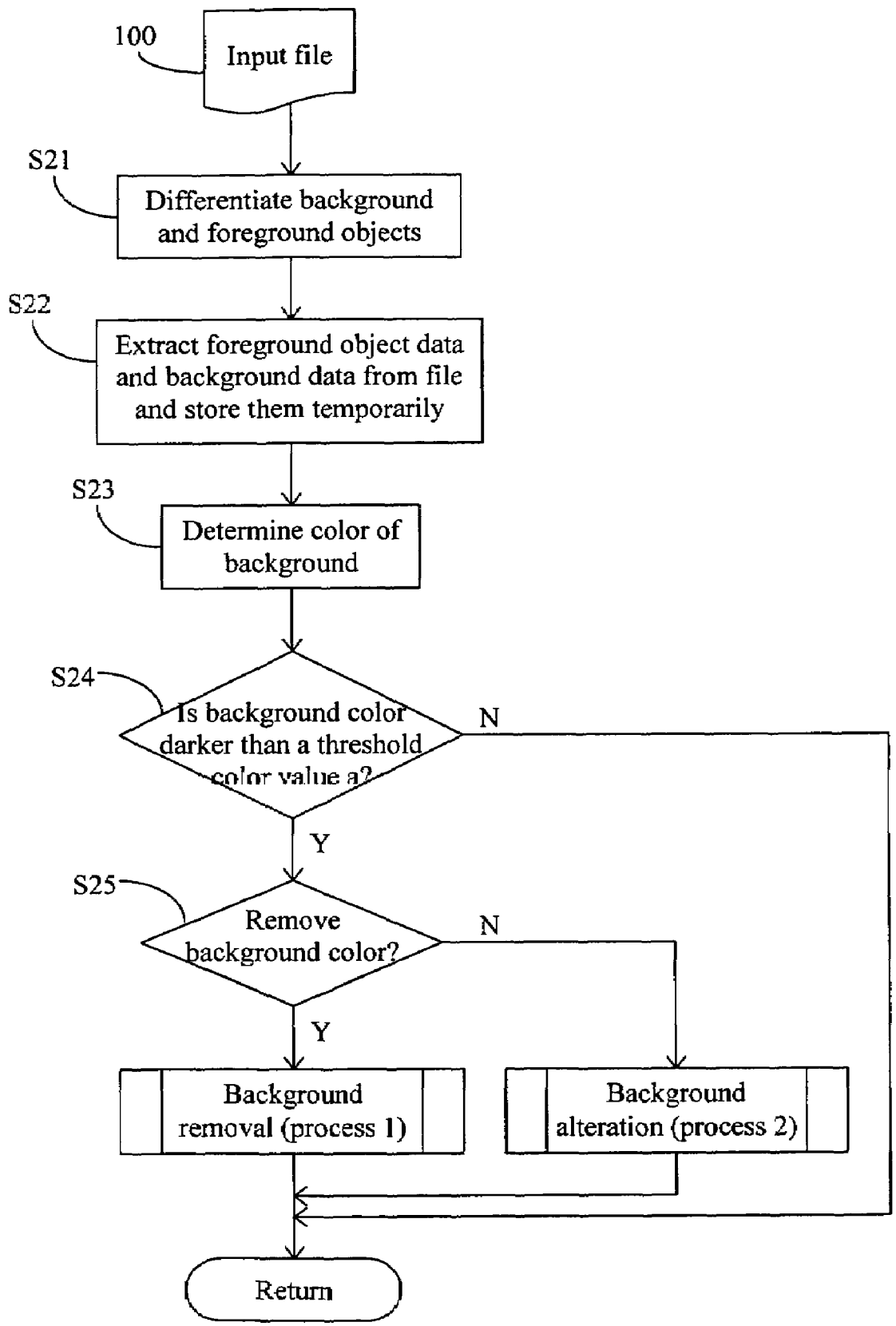
FIGS. 2-4 are flow charts illustrating a method of background conversion according to an embodiment of the present invention.

FIG. 2 is a program flowchart illustrating the object extraction and background processing processes 11 and 12 in more detail. The input file 100 is analyzed to differentiate graphics, text, photographs, etc. (collectively referred to as foreground objects hereinafter) and background objects (step S21). This can be accomplished easily for files in many formats such as PostScript, PDF, HTML, etc. which contain code that specifies background data. If the file to be printed is a bitmap image and does not contain code that specifies background data, the program analyzes the image to identify the background area. For example, the program may look for large, contiguous areas with a uniform color. If the program identifies large contiguous areas with different uniform colors, the program may assume that the areas of the same color that have the largest total area (as measured by the number of pixels, for example) is the background. Foreground object data and background data are extracted from the file and stored temporarily (step S22). Step S22 may be omitted, in which case the input file may be analyzed a second time when processing the color of the foreground objects (see descriptions of FIGS.

3 and 4 below). Then, the program determines the color of the background (step S23), and compares it to a pre-defined threshold color value a (step S24). The color of the background may be described, for example, by a gray level value, RGB values, or CYMK values. The threshold color value may be inputted by the user, or may be a default value such as 128. Identical or different threshold values may be used for different color channels. If the background color is not darker than the threshold color value ("N" in step S24), the program returns. If the background color is darker than the threshold color value ("Y" in step S24), the program prompts the user to specify whether the background color is to be removed. This may be accomplished by displaying a popup window on the computer screen and receiving a user input from a mouse or keyboard. If the background color is to be removed ("Y" in step S25), a background removal process (process 1) is executed, otherwise ("N" in step S25), a background alteration process (process 2) is executed. Background removal process and background alteration process are illustrated in FIGS. 3 and 4, respectively.

Figure 3:
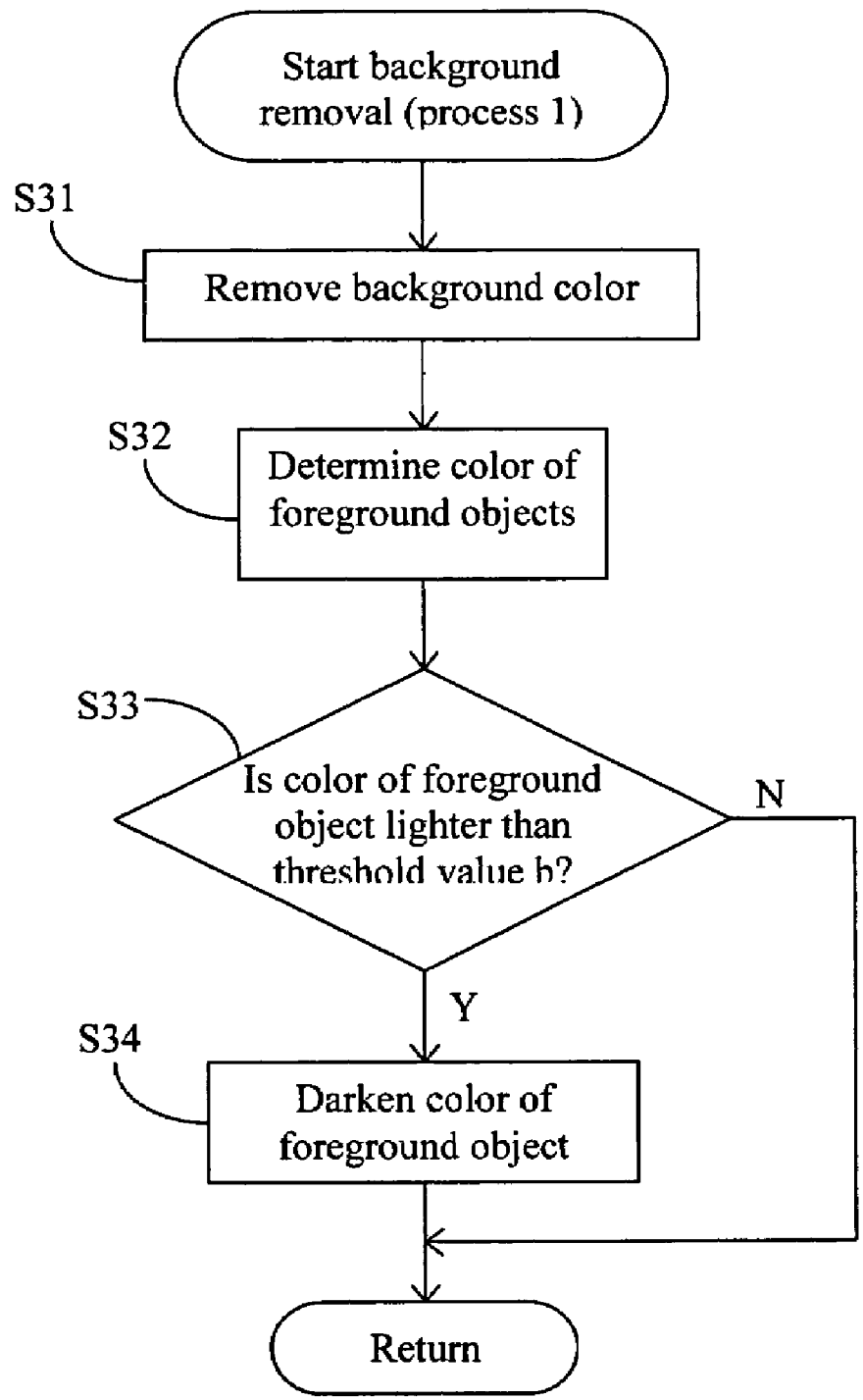

As shown in FIG. 3, in the background removal process (process 1), the background color is removed by setting the color value to a value representing white (i.e. colorless), such as 0 (step S31). The program then determines the colors of the foreground objects (step S32), and if the colors are lighter than a threshold value b ("Y" in step S33), the colors of the foreground objects are darkened, e.g., changed to black or a darker color (e.g. 255) (step S23). This ensures that adequate contrast between foreground objects and the background is maintained. If the colors of the foreground objects are not lighter than the threshold color value b ("N" in step S33), the colors of the foreground objects are unchanged. The threshold color value b is preferably equal to the threshold color value a used in step S25 to determine whether background is dark; alternatively, they may be different. Steps S33 and S34 are repeated for all foreground objects. In a case where photographic objects are included in foreground objects, such photographic objects may be exempted from the darkening process since it is highly anticipated that the original colors of the photographic objects are important.

Figure 4:
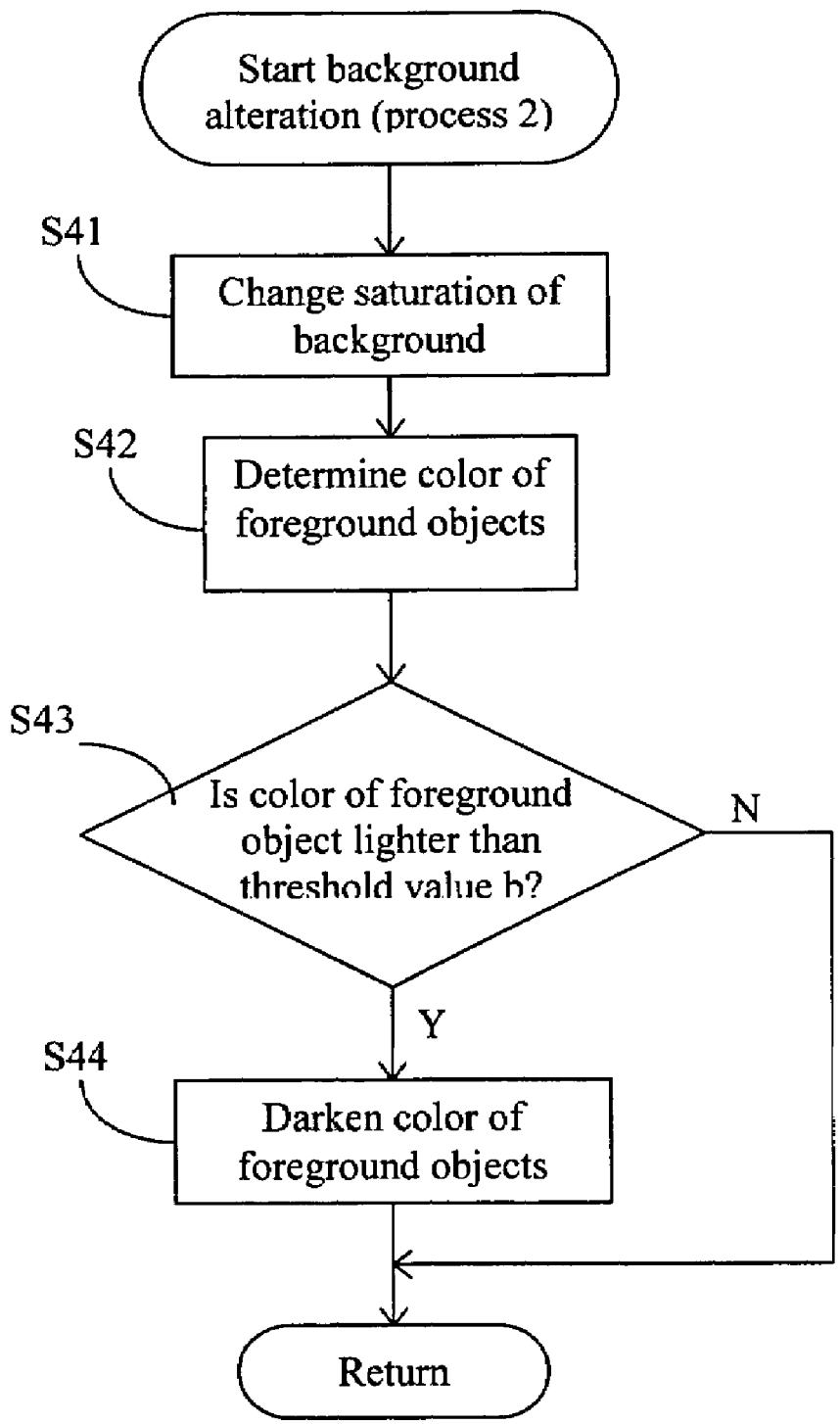

As shown in FIG. 4, in the background alteration process (process 2), the saturation of the background color is changed (step S41). For example, the saturation may be reduced by 50%. The remaining steps S42 to S44 are similar to the corresponding steps in the background removal process (process 1). In step S44, the color of the foreground objects is preferably changed to a color by taking into consideration the saturation of the background color so as to maintain an adequate contrast between the foreground objects and the background. Similar to the case of the background removal process (process 1), photographic objects may be exempted from the color changing process.

Some documents may not have a uniform background with a solid color. For example, a document may have one region with a background of one solid color, and another region with a background of another solid color. The document may also have a patterned background. If the input file is of a format that contains code that specifies background data (such as PostScript, PDF, HTML/XHTML), then a non-uniform background can be treated in a straightforward manner. The program will identify any data specified by the file as background data, and substitute it with data representing a white (colorless) or lighter colored background. If the input file is a bitmap image that does not specify what data represents the background, a more sophisticated process of identifying background is required.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method implemented in a computer or printer for printing an input file, comprising:
    (a) analyzing the input file to extract data representing a background;
    (b) examining the data extracted in step (a) to determine a color of the background; and
    (c) if and only if the color of the background is darker than a first threshold color value, changing the color of the background.

2. The method of claim 1, wherein the input file contains code that specifies the background, and wherein step (a) comprises identifying the code in the input file that specifies the background.

3. The method of claim 1, wherein the input file contains a bitmap image, and wherein step (a) comprises analyzing the bitmap image to determine the color of the background.

4. The method of claim 1, wherein in step (c), the color of the background is changed to a white color.

5. The method of claim 1, wherein in step (c), a saturation of the background color is changed.

6. The method of claim 1, further comprising receiving a user input specifying whether the background color is to be removed.

7. The method of claim 1, further comprising:
    (d) if the color of the background is changed, determining a color of a foreground object in the input file; and
    (e) if the color of the foreground object is lighter than a second threshold color value, darken the color of the foreground object.

8. The method of claim 7, wherein the foreground object represents one of text object and graphics object.

9. The method of claim 7, wherein the second threshold color value is equal to the first threshold color value.

10. The method of claim 1, wherein step (a) further includes extracting data representing a foreground, the method further comprising temporarily storing the extracted background data and foreground data.

11. The method of claim 10, wherein the foreground represents at least one of text and graphics.

12. A method implemented in a computer or printer for printing an input file, comprising:
    (a) receiving a user input specifying a threshold color value;
    (b) analyzing the input file to extract data representing a background;
    (c) examining the data extracted in step (b) to determine a color of the background; and
    (d) if and only if the color of the background is darker than a threshold color value, changing the color of the background.

13. A computer program product comprising a computer usable medium having a computer readable program code embedded therein for controlling a data processing apparatus, the computer readable program code configured to cause the data processing apparatus to execute a process for printing an input file, the process comprising:
    (a) analyzing the input file to extract data representing a background;

(b) examining the data extracted in step (a) to determine a color of the background; and (c) if and only if the color of the background is darker than a first threshold color value, changing the color of the background.

14. The computer program product of claim 13, wherein the input file contains code that specify the background, and wherein step (a) comprises identifying the code in the input file that specify the background.

15. The computer program product of claim 13, wherein the input file contains a bitmap image, and wherein step (a) comprises analyzing the bitmap image to determine the color of the background.

16. The computer program product of claim 13, wherein in step (c), the color of the background is changed to a white color.

17. The computer program product of claim 13, wherein in step (c), a saturation of the background color is changed.

18. The computer program product of claim 13, wherein the process further comprises receiving a user input specifying whether the background color is to be removed.

19. The computer program product of claim 13, wherein the process further comprises receiving a user input specifying the first threshold color value.

20. The computer program product of claim 13, wherein the process further comprises:

(d) if the color of the background is changed, determining a color of a foreground object in the input file; and (e) if the color of the foreground object is lighter than a second threshold color value, darken the color of the foreground object.

21. The computer program product of claim 20, wherein the foreground object represents one of a text object and graphics object.

22. The computer program product of claim 20, wherein the second threshold color value is equal to the first threshold color value.

23. The computer program product of claim 13, wherein step (a) further includes extracting data representing a foreground, and wherein the process further comprises temporarily storing the extracted background data and foreground data.

24. The computer program product of claim 23, wherein the foreground represents one of a text object and graphics object.

\* \* \* \* \*